May 7, 1963   J. A. JEPHCOTT   3,089,072
RECHARGEABLE ELECTRIC BATTERY UNIT
Filed Sept. 22, 1959   2 Sheets-Sheet 1
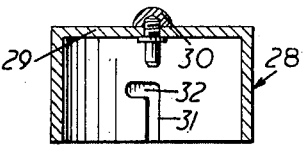
FIG.1.
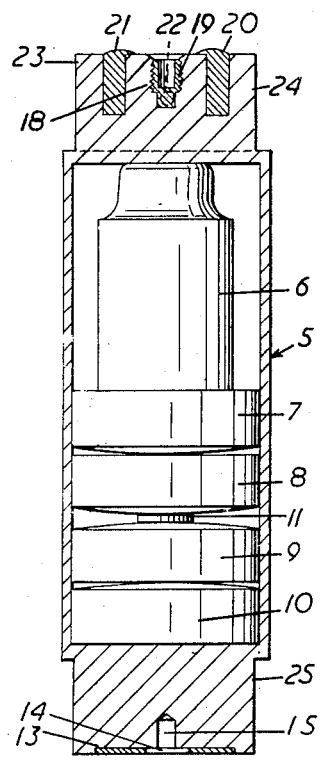
FIG.2.
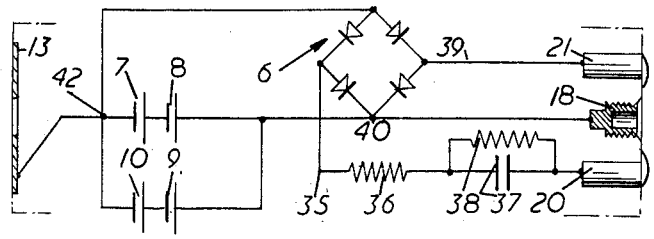
Inventor
JOHN ANTHONY JEPHCOTT
By Bacon & Thomas
Attorneys May 7, 1963 J. A. JEPHCOTT 3,089,072
RECHARGEABLE ELECTRIC BATTERY UNIT
Filed Sept. 22, 1959 2 Sheets-Sheet 2
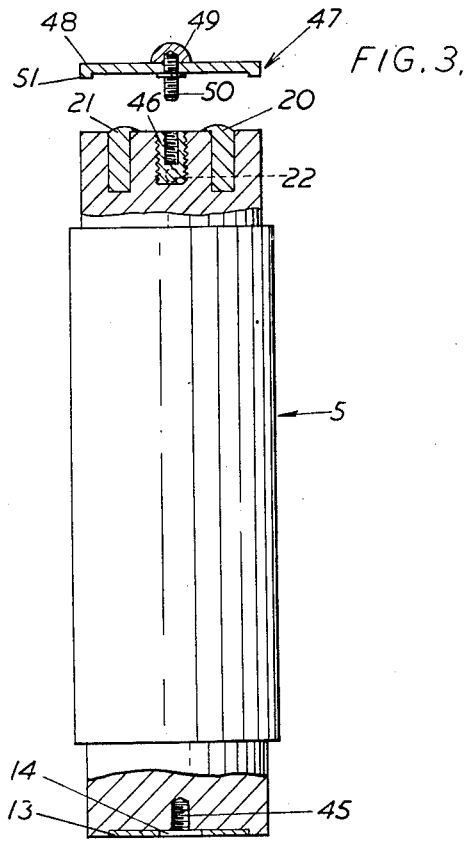
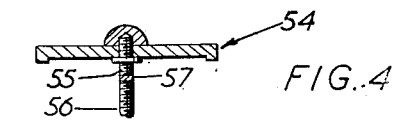
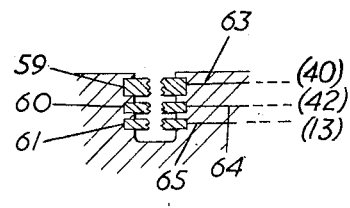
Inventor
JOHN ANTHONY JEPHCOTT
By Bacon & Thomas
Attorneys

United States Patent Office

3,089,072
Patented May 7, 1963

---

3,089,072
RECHARGEABLE ELECTRIC BATTERY UNIT
John Anthony Jephcott, Abingdon, England, assignor to Longworth Scientific Instrument Company Limited, Abingdon, England, a company of Great Britain
Filed Sept. 22, 1959, Ser. No. 841,498
Claims priority, application Great Britain Oct. 6, 1958
9 Claims. (Cl. 320—2)

This invention relates to a rechargeable electric battery.

It is known to combine one or more miniature secondary cells such as nickel-cadmium button cells in a battery so that the battery can be used in conventional electrical apparatus. In order to charge such batteries from an A.-C. supply, additional charging equipment is necessary, and care must be taken that the batteries are charged in the correct direction having regard to the polarity of the battery terminals, since otherwise a dangerous explosion may result.

One way of overcoming this latter difficulty is to incorporate in electrical apparatus with which it is intended to use such batteries, a permanent charging circuit which is so arranged that provided the battery is first disposed in the apparatus in the correct way, then during charging, the correct connections will automatically be made to the battery.

In electrical apparatus designed for use solely with expendable primary batteries, e.g. flashlights, there has of course, been no need to provide charging circuits for such apparatus.

It is one object of the invention to provide a rechargeable battery which can be readily recharged and which is suitable for general use, i.e. it is capable of being used in suitable types of electrical apparatus designed originally for use with conventional primary batteries.

According to the invention there is provided a battery comprising a casing in which there is disposed one or more rechargeable cells and a rectifier circuit, the casing having at one end a first output terminal from the cells and at the other end, a second output terminal from the cells and connector means permitting connection of the rectifier circuit to a source of power, and means adapted in operation so to isolate said first output terminal during charging that there is no risk of a user receiving a shock therefrom.

It is possible to construct a battery according to the invention whose output voltage and external dimensions are the same as those of certain conventional batteries consisting of one or more primary cells. Furthermore, by having an output terminal at each end, such a battery can be used in electrical apparatus designed originally to take the equivalent conventional battery of the same type i.e. having an output terminal at each end, without modification of that apparatus.

Since the rectifier circuit is permanently incorporated in the battery, the manufacturer can ensure that the correct connection between the rectifier circuit and the cells will be made during charging so that there is no possibility of a user effecting an incorrect connection.

However, if for example the first output terminal was connected to the cells during charging and was accessible on the exterior of the battery, there would be the possibility of receiving a shock from the first output terminal. In order to eliminate this possibility, and thereby to make the battery suitable for general domestic use, the battery includes said means adapted to isolate the first output terminal during charging.

The first output terminal from the cells can for example, be a socket which is recessed below the level of said one end of the battery in such a way that it cannot readily be touched by hand, and when it is desired to use the battery as a source of electricity, a removable contact plate may be fitted into the socket to connect the contact plate to the cells, which contact plate then serves as one of the terminals of the battery. Before charging, the contact plate must first be removed from the socket so that in effect the socket is isolated from the exterior of the battery. Again if desired, the first output terminal may be a contact plate which is spring loaded so as only to complete a circuit through the cell when the spring loaded plate is urged inwardly e.g. by a base spring such as is commonly used in known hand torches.

Alternatively the first output terminal may be isolated from the exterior of the battery by providing a removable insulating cover which is fitted over said one end of the battery during charging. Such a cover can for example comprise a cap member made of insulating material such as rubber, Bakelite or plastic.

The said connector means can for example comprise two spaced pins connected to the rectifier circuit and arranged in the form of a two pin plug which can be readily inserted into a suitable socket.

Preferably however, the connector means comprises two spaced contacts connected to the rectifier circuit, and a bayonet flitting whereby the connector means may be plugged into a bayonet socket to conduct electricity from the socket to the rectifier. This form of connector means can for example, be constructed to fit a domestic light-bulb socket of the bayonet type.

The second output terminal can for example comprise a spring-loaded pin disposed between the two spaced pins or contacts of said connector means, the spring-loaded pin standing proud of the spaced pins or contacts when the battery is being used as a source of electricity, and being urged into the interior of the battery as the latter is fitted into a suitable socket to connect an A.C. source to the spaced pins or contacts. Alternatively, where the connector means includes two spaced contacts, the second output terminal can comprise a fixed contact disposed intermediate the spaced contacts. With this arrangement, there is the danger that in time, the fixed and spaced contacts will become permanently distorted so that the fixed contact short-circuits one or both of the spaced contacts. Preferably, therefore, the second output terminal comprises a conducting socket disposed in a recess below the level of said other end of the battery casing. In this arrangement it is necessary in order to use the battery as a source of electricity, to provide a removable contact member which may be plugged or screwed or otherwise connected to the second output terminal socket and which then serves as one of the terminals of the battery. Preferably, the removable contact member comprises a metal pin which is secured to and extends centrally through the end face of a cup-shaped cap member made of insulating material.

This arrangement has the advantage that the part of the contact member on the outside of the cap member is not restricted in size by the connector means connected to the rectifier circuit.

Thus two removable cap members may be provided with the battery one for each end thereof, and during use of the battery, only the one appropriate cap member will be mounted on the battery. This arrangement suffers from the disadvantage that the cap member not mounted on the battery is liable to be lost.

It is preferred, therefore, that only one removable cap member is provided with the battery, which cap member is adapted to fit on or be otherwise secured to both ends of the battery casing, the cap member serving, when it is fitted on said one end, to isolate the first output terminal from the exterior of the battery, and when it is fitted on said other end, to provide a connection between said second output terminal and the exterior of the cap member.

Thus for example, if the second output terminal is in the form of a socket disposed in a recess below the level of the end of the casing, so that the cap member must have a contact pin extending therethrough to engage the socket when the cap member is fitted on said other end, the first output terminal can be in the shape of a disc having an aperture therein through which the pin of the cap member can pass without making electrical contact with the disc. In this case, the disc can be regarded as being equivalent to the bottom of the zinc can of a conventional single cell primary battery.

It will be appreciated that instead of fitting the cap member on said first end of the battery casing in order to avoid the possibility of receiving a shock from the first output terminal during charging, the cap member may be adapted to fit only on said other end of the battery casing, the latter incorporating a switch which is operable by the cap member, or a pair of contacts which can be electrically interconnected by the cap member, so as to make or break a connection between the cells and said first output terminal depending on whether the cap member is fitted on or removed from said other end of the battery casing.

If a disc-shaped cap member is provided having a contact pin extending therethrough, the cap member may be held in position on either end of the casing by making the contact pin screw-threaded so as to be engageable with corresponding internal screw threads formed in the socket of the second output terminal and in a socket formed in insulating material at the opposite end of the casing to said second output terminal, i.e. at said one end of the battery casing.

There will now be described by way of example only, one embodiment of the invention with reference to the drawings accompanying the specification in which:

FIG. 1 is a diagrammatic cross-sectional view of a rechargeable battery according to the invention showing the cap member removed and from which the wiring has been removed for clarity, and FIG. 2 is a circuit diagram of the battery shown in FIG. 1;

and two embodiments of the invention with reference to the accompanying drawings in which:

FIG. 3 is a diagrammatic cross-sectional view of a modified form of rechargeable battery according to the invention, and FIG. 4 is a diagrammatic cross-sectional view of the top end of a further modified form of rechargeable battery.

With reference to FIG. 1, the battery comprises a cylindrical plastic casing 5 in which there is disposed a rectifier circuit 6 and four miniature nickel-cadmium cells 7, 8, 9 and 10, separated in pairs by a contact plate 11.

At the bottom end of the casing 5, there is one output terminal from the cells in the form of a disc 13 having a central aperture 14 therein, and centrally of the casing there is a hole 15.

At the top of the casing, there is a second output terminal 18 from the cells which is in the form of a hollow socket disposed in a recess 19 below the level of the top end of the casing.

Diametrically on either side of the socket 18, there are two contacts 20, 21 connected to the rectifier circuit 6, and on a line at right angles to the line joining the contacts 20, 21 there are two pins 22 (only one of which is shown in dotted line) which project from the side 23 of the casing.

Both the top and the bottom ends 23, 25 of the casing are of smaller diameter than the main body of the casing so that a cap member 28 can be fitted on either end.

The cap member 28 comprises a cup-shaped cap 29 of plastic material and a conductor in the form of a pin 30 which is secured centrally of the cap. On the interior wall of the cap 28, there are two grooves 31 (only one of which is shown (in which the pins 22 respectively engaged when the cap member 28 is fitted on the top of the casing 5. The tops of the grooves 31 are directed sideways as shown at 32 in the manner of a conventional domestic light-bulb bayonet socket, so that the cap member 28 will be held in place during operation of the battery.

With reference to FIG. 2, the cells 7, 8, 9 and 10 are connected in a series-parallel arrangement to the disc 13 and the socket terminal 18.

The rectifier 6 is a conventional full-wave rectifier designed to rectify a mains supply. The input sides of the rectifier 6 are connected to the contacts 20, 21 by a lead 35 which contains a conventional smoothing network comprising a resistance 36, and a condenser 37 which is shunted by a high resistance 38, and by a lead 39 respectively. The positive output side of the rectifier 6 is connected to the positive side of the cell assembly at point 40, and the negative output side to the negative side of the cell assembly at the point 42.

The rectifier 6 together with its smoothing circuit 35, 36, 37 and 38 are all enclosed in a single assembly as indicated in FIG. 1. The leads joining the rectifier assembly, the cell assembly and the external contacts 13, 18, 20 and 21 are laid in channels cut in the casing 5.

When it is desired to use the battery as a source of voltage, the cap member 28 is fitted on the top of the battery, and the pin 30, making electrical contact with the socket 18, serves as the positive pole of the battery, the negative pole being the disc 13.

To charge the battery, the cap member 28 must first be removed and should then be placed on the bottom end 25 with which the cap member makes a press fit. The pin 30 extends into the hole 15 out of electrical contact with the disc 13 so that the disc 13 is insulated from the exterior of the battery.

The top end 24 of the casing is then plugged into a suitable bayonet socket connected to a mains supply for the required period of time, and since both the contacts 13 and 18 will then be effectively insulated from the exterior of the battery, there will be no possibility of receiving a shock from the battery during charging.

With reference to FIG. 3, the rechargeable battery there shown differs from that shown in FIGS. 1 and 2 only in the shape of the casing 5, that the cap member 47 is disc-shaped, and that the pin 50 of the cap-member is screw-threaded so as to be engageable with corresponding internal screw threads formed in the socket 46 and the hole 45 (corresponding respectively with the socket 18 and hole 15 of the embodiment shown in FIGS. 1 and 2).

When the cap member 47 is screwed onto the top end of the casing 5, a rim 51 of the plastic disc 48 abuts the perimeter of the end face of the casing 5. If there was no rim 51 on the plastic disc 48, it would be prevented from fitting closely against the end face of the battery casing by the contacts 20, 21 unless these contacts were recessed below the lever of the end face of the casing. The diameter of the plastic disc 48 is greater then the diameter of the disc-shaped output terminal 13, so that when the cap member 47 is screwed onto the bottom end of the casing 5, the terminal 13 is insulated from the exterior of the battery.

As in the embodiment shown in FIG. 1, the top end of the casing 5 is formed as a bayonet plug which can readily be fitted into a suitable bayonet socket connected to a mains supply for recharging.

With reference to FIG. 4, only the top end and cap member of a rechargeable battery which is generally similar to that shown in FIG. 3 are illustrated.

As regards the cap member 54, the pin thereof comprises two conducting portions 55, 56 which are insulated from one another as diagrammatically indicated by the disc 57 of insulating material.

At the top end of the battery, instead of a unitary socket 46 shown in FIG. 3, three separate contact rings 59, 60 and 61 are provided which are connected respectively by leads 63, 64 and 65 to points 40, 42 and 13 respectively of the electrical circuit shown in FIG. 2, the lead connecting points 42 and 13 in FIG. 2 being omitted in the present embodiment.

The pin of the cap member 54 and the rings 59, 60 and 61 are screw-threaded, and when the cap member 54 is screwed into these rings so that it fits closely against the end face of the battery casing, portion 55 of the pin of the cap member 54 makes contact with ring 59, and portion 56 interconnects rings 60 and 61, the insulating disc 57 being disposed intermediate the rings 59 and 60 and insulating them from one another. Thus the portion 56 of the pin of the cap member 54 serves to connect the terminal plate 13 at the bottom end of the battery to the point 42 of the battery circuit.

When the cap member 54 is unscrewed and removed from the battery, the connection between the terminal plate 13 and the point 42 is broken so that there will be no possibility of a person receiving a shock if he were to touch the terminal plate 13 whilst the battery was being recharged.

Instead of two contact rings 60 and 61, it will be appreciated that a split ring can be used, or two leaf spring contacts which are so arranged as to be spring urged against portion 56 of the pin of the cap member when the latter is inserted in position, the portion 56 then bridging the two leaf spring contacts. In the latter case, when the cap member is removed, the two leaf spring contacts must of course not make contact with one another, since then there would be the possibility of a person receiving a shock during charging of the battery.

Another alternative arrangement which avoids the need for providing the pin of the cap member with separate conducting portions is to provide a fixed contact and a movable leaf spring contact within a space formed in the insulating material at the top end of the battery, the movable leaf spring contact being urged against the fixed contact as the pin of the cap member is inserted into its socket by a movable ball of insulating material projecting through the wall of the socket. The two contacts are connected to the plate 13 and the point 42 (FIG. 2).

It will be appreciated that only three embodiments of the invention have been described by way of example and many modifications and variations may be made thereto without departing from the scope of the invention. For example, the rectifier 6 could if desired be a half-wave rectifier.

What I claim is:

1. A rechargeable battery device comprising a casing in which there is disposed at least one rechargeable cell and a rectifier circuit, the casing having at one end a first output terminal from the cell and at the other end connector means for connecting the rectifier circuit to a source of power and a second output terminal from the cell disposed between said connector means, and movable means adapted in operation to isolate said first output terminal during charging so that that is no risk of a user receiving a shock therefrom which means incorporate a current conducting terminal portion engageable with said second output terminal when the device is to be used as a source of power.

2. A device as claimed in claim 1 in which said means adapted to isolate the first output terminal during charging comprises a removable insulating cap member having a contact member extending therethrough and adapted to be selectively fitted on either end of the casing, which cap member, when the assembly is being used as a source of power, is fitted on said other end of the casing so that its contact member is connected to said second output terminal and serves as one of the terminals of the device, the cap member, during a charging operation being fitted onto said one end of the casing to isolate said first output terminal from the exterior of the assembly so that there is no risk of a user receiving a shock from said first output terminal.

3. A device as claimed in claim 1 in which said means adapted to isolate the first output terminal during charging comprises two contacts connected respectively to the cells and to said first output terminal, and a movable member which effects interconnection of said two contacts when the assembly is used as a source of power, and which is moved to break said interconnection when the assembly is being charged.

4. A rechargeable battery device comprising a casing in which there is disposed at least one rechargeable cell and a rectifier circuit, the casing having at one end a first output terminal from the cells in the form of an apertured disc, and at the other end a second output terminal from the cells in the form of a conducting socket, and connector means adapting the device for connection of the rectifier circuit to a source of power for passing a charging current through the cells, there being provided a removable insulating cap member having a contact member extending therethrough and adapted to be selectively fitted on either end of the casing, which cap member, when the assembly is being used as a source of power, is fitted on said other end of the casing so that its contact member is connected to said second output terminal and serves as one of the terminals of the device the cap member during a charging operation being fitted onto said one end of the casing to isolate said first output terminal from the exterior of the assembly so that there is no risk of a user receiving a shock from said first output terminal.

5. A device as claimed in claim 4 in which said conducting socket is disposed in a recess below the level of said other end of the battery casing.

6. A device as claimed in claim 4 in which said insulating cap member is cup-shaped.

7. A device as claimed in claim 4 in which said contact member of the insulating cap member is screw-threaded to engage corresponding internal screw threads provided in said conducting socket, and in a socket formed in insulating material at said one end of the battery casing, thereby to hold the removable cap member in position at either end of the battery casing.

8. A device as claimed in claim 4 in which said rectifier circuit is a full-wave rectifier.

9. A rechargeable battery device comprising a casing in which there is disposed at least one rechargeable cell and a rectifier circuit, the casing having at one end a first output terminal and at the other end connector means permitting connection of the rectifier circuit to a source of power, for passing a charging current through the cells and terminal means comprising three separate axially spaced conducting sockets, the outermost socket serving as a second output terminal from the cells, and the other two sockets being connected respectively to the cells and to said first output terminal, there being provided a removable insulating cap member having a pin with two separate conducting portions along its length whereby when the pin of the cap member is inserted into said sockets, said first conducting portion connects the outermost socket to one of the battery assembly terminals, and the second conducting portion interconnects said other two sockets, the removal of the cap member prior to charging serving to break the interconnection between said two sockets so as to electrically isolate said first output terminal.

References Cited in the file of this patent
UNITED STATES PATENTS 2,876,410    Fry _____ Mar. 3, 1959
3,013,198    Witte et al. _____ Dec. 12, 1961